United States Patent
Tan et al.

(10) Patent No.: US 7,460,287 B2
(45) Date of Patent: Dec. 2, 2008

(54) ARRANGEMENT FOR AND METHOD OF INCREASING PIXEL SYMMETRY, ESPECIALLY FOR IMAGE PROJECTION ARRANGEMENTS

(75) Inventors: Chinh Tan, Setauket, NY (US); Dmitriy Yavid, Stony Brook, NY (US); Miklos Stern, Woodmere, NY (US); Carl Wittenberg, Water Mill, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 54 days.

(21) Appl. No.: 11/131,139

(22) Filed: May 17, 2005

(65) Prior Publication Data

US 2006/0262179 A1 Nov. 23, 2006

(51) Int. Cl.
*G02B 26/08* (2006.01)
*G03B 21/14* (2006.01)

(52) U.S. Cl. ..................... 359/196; 353/100

(58) Field of Classification Search ............ 347/254, 347/229, 259; 235/462.22, 462.2; 345/156; 359/668, 196; 353/121, 98, 100
See application file for complete search history.

(56) References Cited

U.S. PATENT DOCUMENTS

| | | | |
|---|---|---|---|
| 4,607,908 A * | 8/1986 | Ishida et al. ............... 359/200 |
| 4,623,791 A * | 11/1986 | Kaneko et al. ............. 250/234 |
| 4,808,804 A * | 2/1989 | Krichever et al. ...... 235/462.22 |
| 5,742,038 A | 4/1998 | Dvorkis et al. |
| 6,266,080 B1 * | 7/2001 | Gelbart ....................... 347/254 |
| 6,272,249 B1 | 8/2001 | Kobayashi et al. |
| 6,834,805 B2 * | 12/2004 | Dvorkis et al. ............ 235/462.2 |
| 2002/0011520 A1 * | 1/2002 | Gurevich et al. ........ 235/462.21 |
| 2002/0125324 A1 * | 9/2002 | Yavid et al. ............. 235/462.45 |
| 2003/0085867 A1 * | 5/2003 | Grabert ....................... 345/156 |
| 2004/0017518 A1 | 1/2004 | Stern et al. |
| 2004/0228004 A1 * | 11/2004 | Sercel et al. ................ 359/668 |
| 2006/0087628 A1 * | 4/2006 | Dvorkis et al. .............. 353/121 |
| 2006/0119804 A1 * | 6/2006 | Dvorkis et al. ................ 353/98 |
| 2006/0126023 A1 | 6/2006 | Tan et al. |

FOREIGN PATENT DOCUMENTS

JP 05242514 A * 9/1993

OTHER PUBLICATIONS

"Optical raster-scanning displays based on surface-micromachined polysilicon mirrors". Hagelin, P.M.; Solgaard, O.; Selected Topics in Quantum Electronics, IEEE Journal of vol. 5, Issue 1, Jan.-Feb. 1999 pp. 67-74.*

"A MEMS 1D optical scanner for laser projection display using self-assembled vertical combs and scan-angle magnifying mechanism". Yoda, M.; Isamoto, K.; Chong, C.; Ito, H.; Murata, A.; Kamisuki, S.; Atobe, M.; Toshiyoshi, H.; Solid-State Sensors, Actuators and Microsystems, 2005. Digest of Technical Papers. Transducers '05. The 13th Inter.l Conf.*

(Continued)

*Primary Examiner*—Stephen D Meier
*Assistant Examiner*—Carlos A Martinez, Jr.
(74) *Attorney, Agent, or Firm*—Kirschstein et al.

(57) ABSTRACT

A lightweight, compact image projection module, especially for mounting in a housing having a light-transmissive window, is operative for causing selected pixels in a raster pattern to be illuminated to produce an image of high resolution of VGA quality in color. The pixels are rendered symmetrical in cross-section by aligning a narrow dimension of a beam spot of a laser beam along scan lines of the raster pattern.

6 Claims, 7 Drawing Sheets

OTHER PUBLICATIONS

"Two dimensional modulation transfer function of luminance on display images with a mosaic pixel structure". Hase, T.; Consumer Electronics, IEEE Transactions on, vol. 40, Issue 2, May 1994 pp. 83-91.*

"Single layer 2D optical scanners with integrated polymer microlenses". Jeonggi Seo; Sebaek Oh; Lee, L.P.; Optical MEMs, 2002. Conference Digest. 2002 IEEE/LEOS International Conference on, Aug. 20-23, 2002 pp. 151-152.*

* cited by examiner

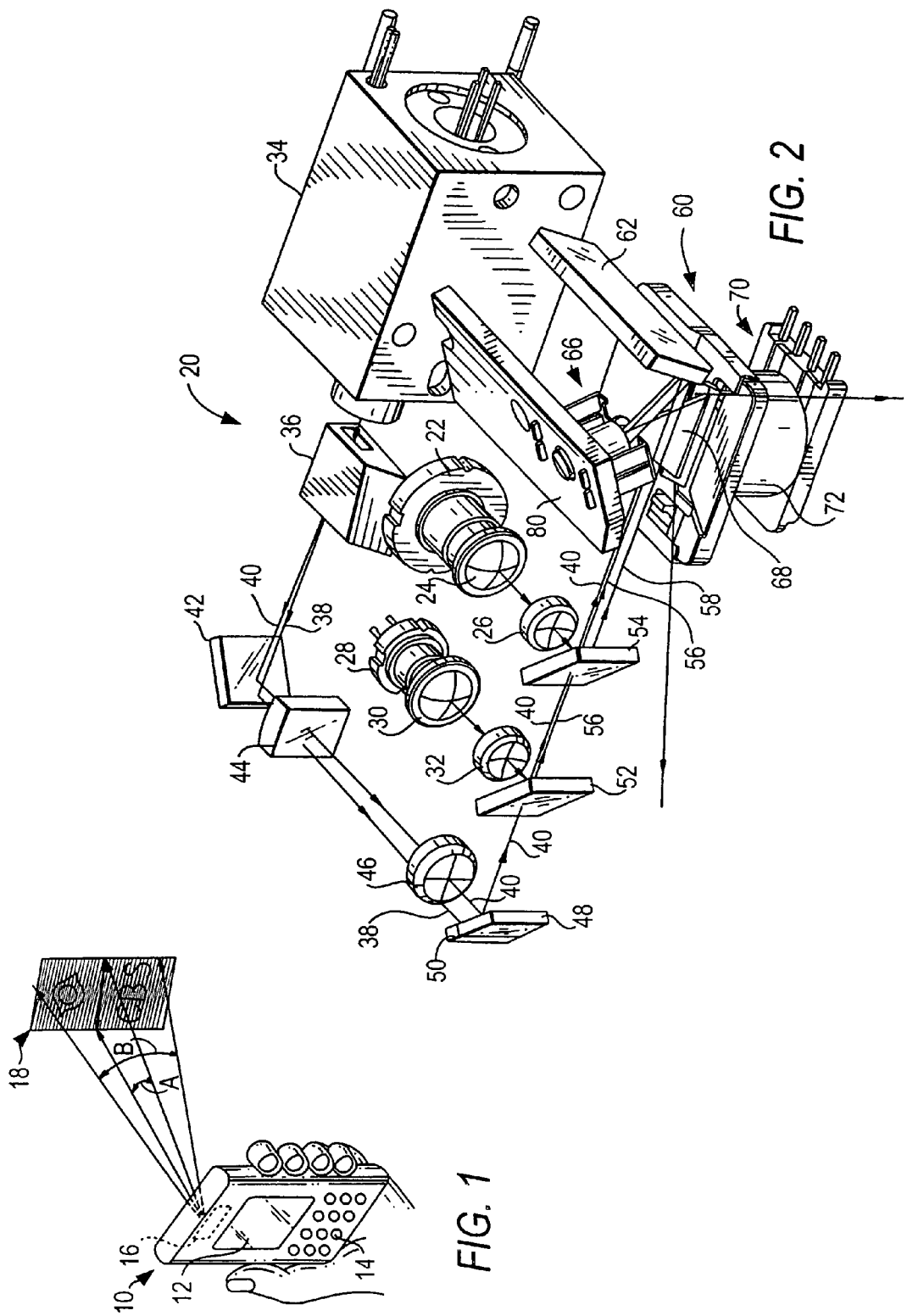

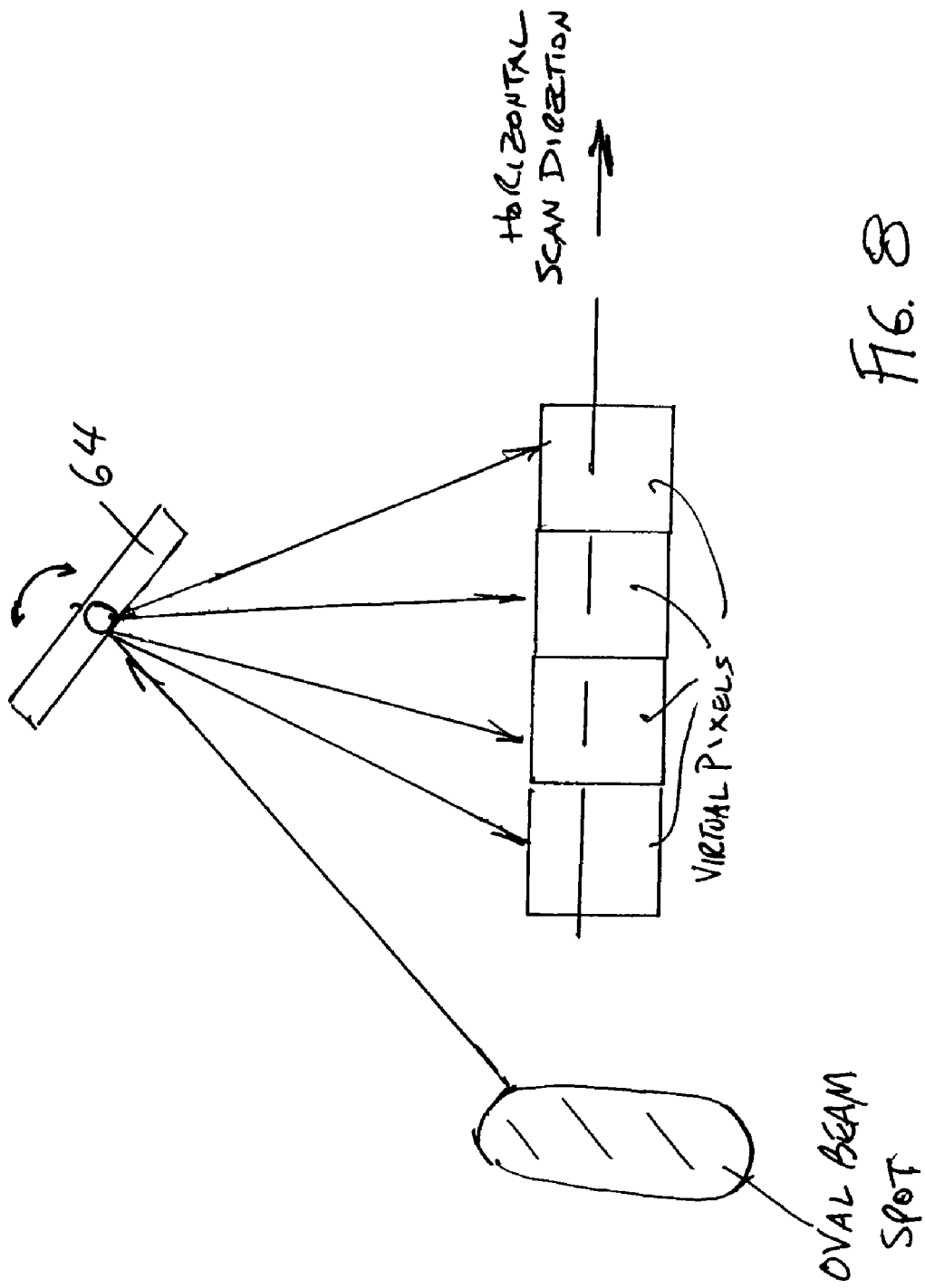

ARRANGEMENT FOR AND METHOD OF INCREASING PIXEL SYMMETRY, ESPECIALLY FOR IMAGE PROJECTION ARRANGEMENTS

BACKGROUND OF THE INVENTION

1. Field of the Invention

The present invention generally relates to projecting a two-dimensional image in color while maintaining low power consumption, high resolution, miniature compact size, quiet operation and minimal vibration and, more particularly, to increasing the symmetry of pixels which comprise the image.

2. Description of the Related Art

It is generally known to project a two-dimensional image comprised of pixels on a screen based on a pair of scan mirrors which oscillate in mutually orthogonal directions to scan a laser beam from a laser over a raster pattern. The laser beam is incident as a beam spot on one of the mirrors, for example, a horizontal scan mirror, to sweep the beam spot along a horizontal scan line extending along a horizontal scan direction. The horizontal scan line is incident on the other of the mirrors, i.e., a vertical scan mirror, to sweep the scan line along the vertical direction, thereby creating the raster pattern. Turning the beam spot on by energizing the laser, as the beam spot is swept along each scan line, causes selected pixels in each scan line to be illuminated and rendered visible, while turning the beam spot off by deenergizing the laser causes the remaining pixels to be non-illuminated. The illuminated and non-illuminated pixels comprise the image being projected.

Although generally satisfactory for their intended purpose, the known image projection arrangements project the image with limited resolution, typically less than a fourth of video-graphics-array (VGA) quality of 640×480 pixels and, moreover, the pixels are asymmetrical, thereby degrading the image. The size of an individual illuminated pixel depends, among other factors, on the initial size of the beam spot (when it is turned on) incident on the horizontal scan mirror and the motion of the beam spot as the horizontal scan mirror sweeps the beam spot. In other words, the size of the illuminated projected pixel is larger than the initial size of the incident beam spot, as considered along the horizontal scan direction. For example, if the incident beam spot on the horizontal scan mirror were circular in cross-section, then the corresponding projected pixel would be elliptical in cross-section with the larger axis aligned along the horizontal scan direction. The projected pixel is thus "stretched" out along the horizontal direction, but is not so stretched along the vertical direction, thus leading to a poorly displayed image comprised of asymmetrical pixels.

SUMMARY OF THE INVENTION

Objects of the Invention

Accordingly, it is a general object of this invention to provide an image projection arrangement that projects a sharp and clear, two-dimensional color image with improved pixel symmetry.

Another object of this invention is to increase the resolution of the color image projected by such arrangements.

Yet another object of this invention is to reduce, if not eliminate, asymmetrical pixels in the projected image.

An additional object is to provide a miniature, compact, lightweight, and portable color image projection arrangement useful in many instruments of different form factors.

Features of the Invention

In keeping with these objects and others which will become apparent hereinafter, one feature of this invention resides, briefly stated, in an image projection arrangement for projecting a two-dimensional, color image. The arrangement includes an optical assembly including at least one laser and preferably a plurality of red, blue and green lasers for respectively emitting red, blue and green laser beams as a composite beam having a beam spot in cross-section; a scanner for sweeping the beam spot in a pattern of scan lines in space, each scan line having a number of pixels; and a controller for causing selected pixels to be illuminated, and rendered visible, by the composite beam to produce the color image.

In the preferred embodiment, the scanner includes a pair of oscillatable scan mirrors for sweeping the composite beam along generally mutually orthogonal directions at different scan rates and at different scan angles. At least one of the scan rates exceeds audible frequencies, for example, over 18 kHz, to reduce noise. At least one of the scan mirrors is driven by an inertial drive at a mechanical resonant frequency to minimize power consumption. The image resolution preferably exceeds one-fourth of VGA quality, but typically equals or exceeds VGA quality.

The arrangement is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

In accordance with this invention, the optical assembly is operative for forming the beam spot incident on one of the scan mirrors, e.g., the horizontal scan mirror, with an oval shape having mutually orthogonal long and narrow spot dimensions, and for orienting this oval beam spot so that its narrow spot dimension extends along each scan line along the horizontal direction swept by the horizontal scan mirror. Thus, when the horizontal scan mirror sweeps the oval beam spot along the respective scan line, the horizontal dimension of the corresponding pixel along the horizontal direction is increased in size. Ideally, the horizontal dimension of the pixel is increased to the same size as the vertical dimension of the pixel, thereby rendering the pixel dimensions more symmetrical and having a generally square or circular shape. In practice, the horizontal pixel dimension may be more or less than the vertical pixel dimension, but, in any event, the symmetry of the pixel in accordance with this invention has been improved, that is, the ratio of the vertical pixel dimension to the horizontal pixel dimension is closer to unity than before.

The orienting of the oval beam spot can be achieved in various ways. For example, if the laser emits an oval beam spot, as in the case of edge-emitting, semiconductor, red and blue lasers, then the laser itself is turned until the narrow spot dimension is aligned along the horizontal scan direction. Optical lenses in the path of the red and blue beams are rotationally symmetric so as to not disturb the beam orientation after the lasers have been rotated.

If the laser emits a circular beam spot, as in the case of a solid-state green laser, then optical elements are placed in the path of the green beam to convert the circular beam spot to an oval beam spot. The optical elements have different optical powers along the mutually orthogonal scan directions. The optical elements can be anamorphic lenses, a cylindrical lens in conjunction with a rotationally symmetric plano-convex lens, a toric lens, two cylindrical lenses whose axes are mutually orthogonal, or a prism.

In further accordance with this invention, the long spot dimension of the oval beam spot extends along a transverse, i.e., vertical, scan direction along which the scan lines are successively arranged. The long spot dimension produces a corresponding long pixel dimension along the transverse scan direction. This long pixel dimension at least partially overlaps an adjacent scan line along the transverse scan direction, thereby blending the adjacent scan lines to produce an aesthetically pleasing image.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

FIG. 8 is a diagrammatic view of an oval beam spot being swept along a scan direction to achieve symmetrical pixels.

DETAILED DESCRIPTION OF THE PREFERRED EMBODIMENTS

Figure 3:
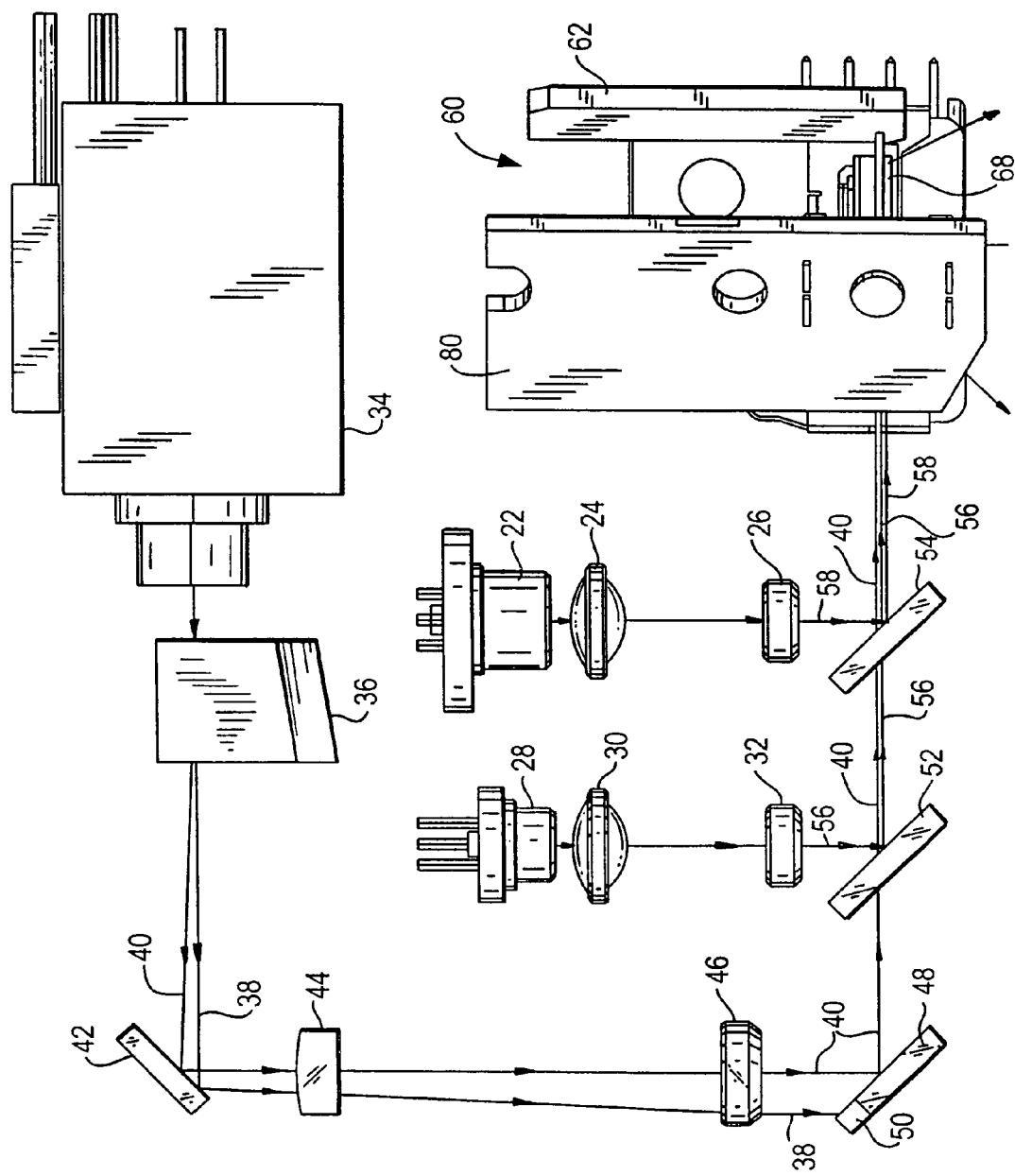
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes an edge-emitting, semiconductor red laser 22 which, when energized, emits a bright red laser beam at about 635-655 nanometers having an oval beam spot in cross-section. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance. The lenses 24, 26 are rotationally symmetric, as explained below.

Another edge-emitting, semiconductor blue laser 28 is mounted on the support and, when energized, emits a diffraction-limited blue laser beam at about 475-505 nanometers having an oval beam spot in cross-section. Another biaspheric convex lens 30 and a concave lens 32 are employed to shape the blue beam profile in a manner analogous to lenses 24, 26. The lenses 30, 32 are also rotationally symmetric, as explained below.

A green laser beam having a wavelength on the order of 530 nanometers is generated not by a semiconductor laser, but instead by a green module 34 having an infrared diode-pumped YAG crystal laser whose output beam at 1060 nanometers. A non-linear frequency doubling crystal is included in the infrared laser cavity between the two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator 36 which creates an acoustic standing wave inside a crystal for diffracting the green beam. The modulator 36, however, produces a zero-order, non-diffracted beam 38 and a first-order, pulsed, diffracted beam 40. The beam 40 has a generally circular beam spot in cross-section. The beams 38, 40 diverge from each other and, in order to separate them to eliminate the undesirable zero-order beam 38, the beams 38, 40 are routed along a long, folded path having a folding mirror 42. Alternatively, an electro-optic, modulator can be used either externally or internally to the green laser module to pulse the green laser beam. Other possible ways to modulate the green laser beam include electro-absorption modulation, or Mach-Zender interferometer.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48. The lenses 44, 46, as explained below, change the initial circular shape of the beam spot incident on the mirror 42 to an oval shape. After reflecting off the mirror 48, the diffracted green beam 40 has an oval beam spot in cross-section.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
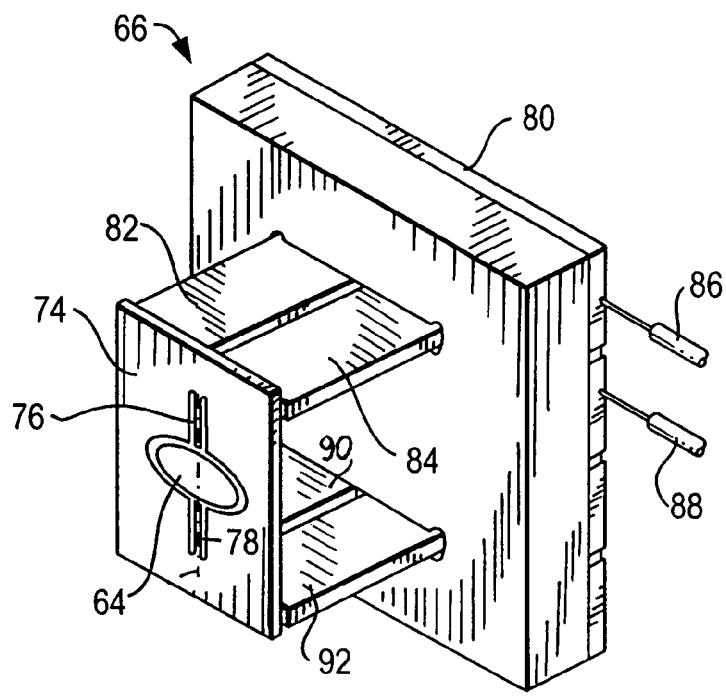
FIG. 4 is a perspective front view of an inertial drive for use in the arrangement of FIG. 2.
Figure 5:
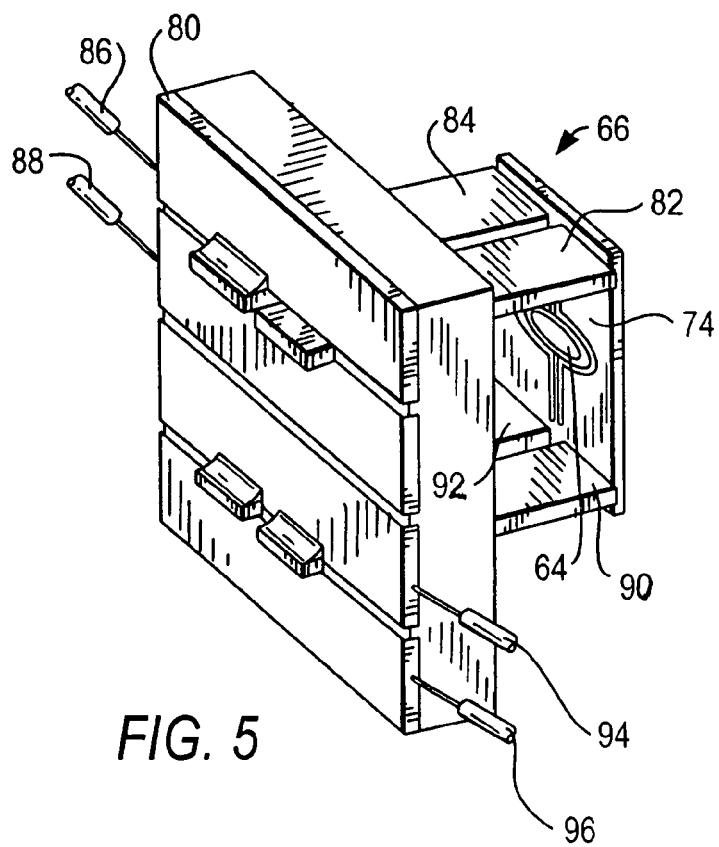
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 7491μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the mechanical resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric elements for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range we can display high-definition television standard, denoted 720p, 1270×720 pixels. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher.

During the mirror's return trip, the lasers can be powered down in order to reduce the power consumption of the device.

Figure 6:
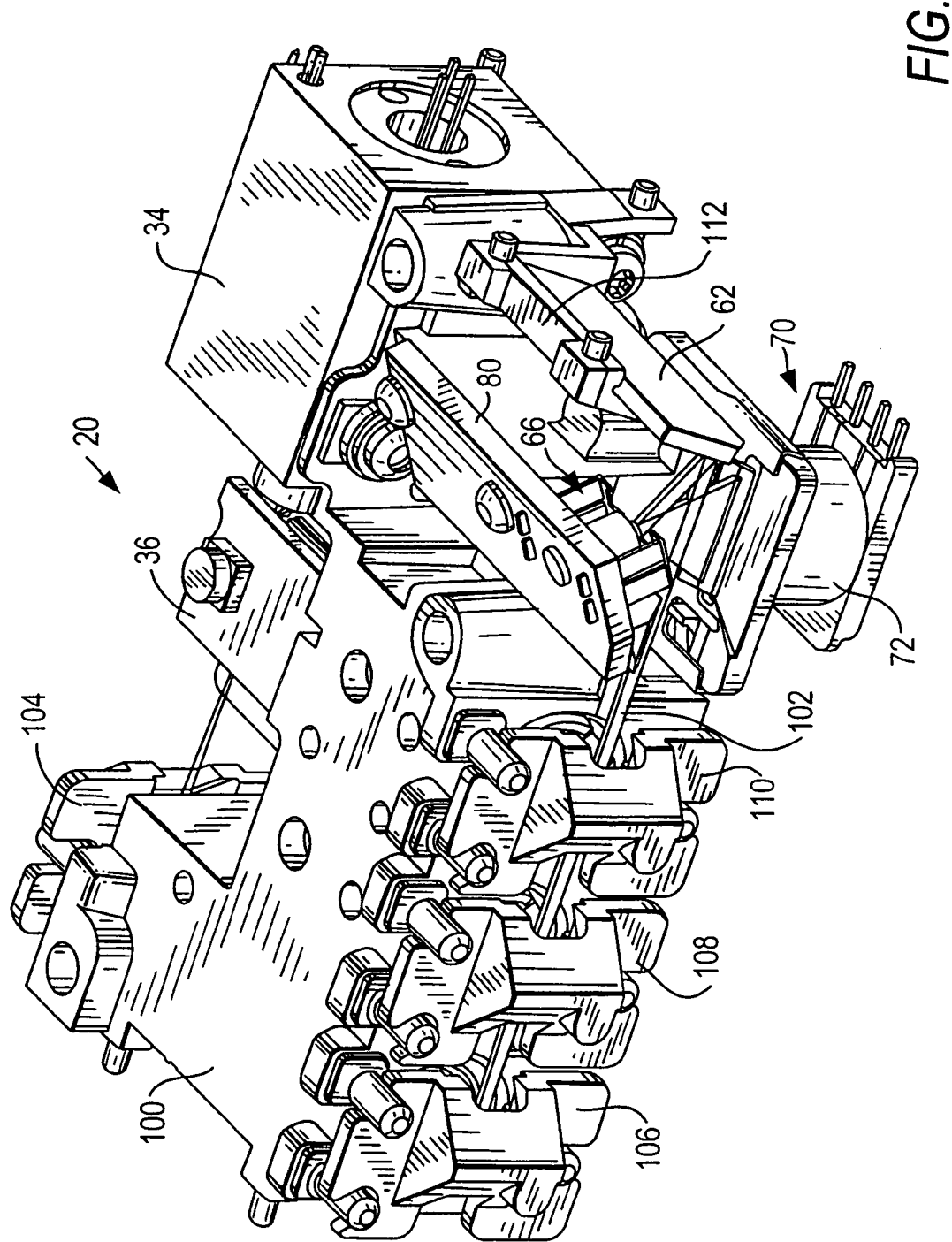
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7H:
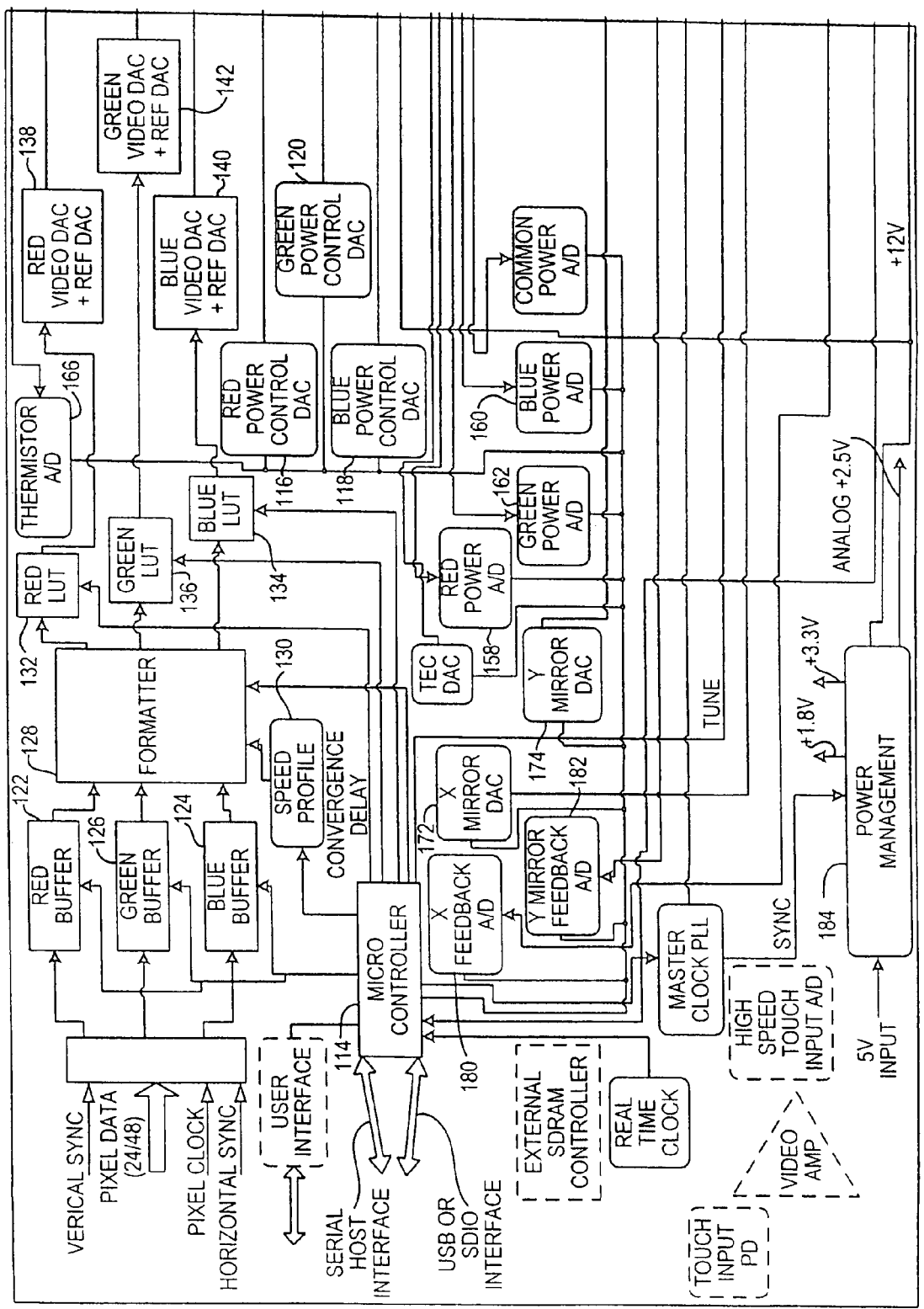
FIGS. 7A, 7B together comprise an electrical schematic block diagram depicting operation of the arrangement of FIG. 2.
Figure 7B:
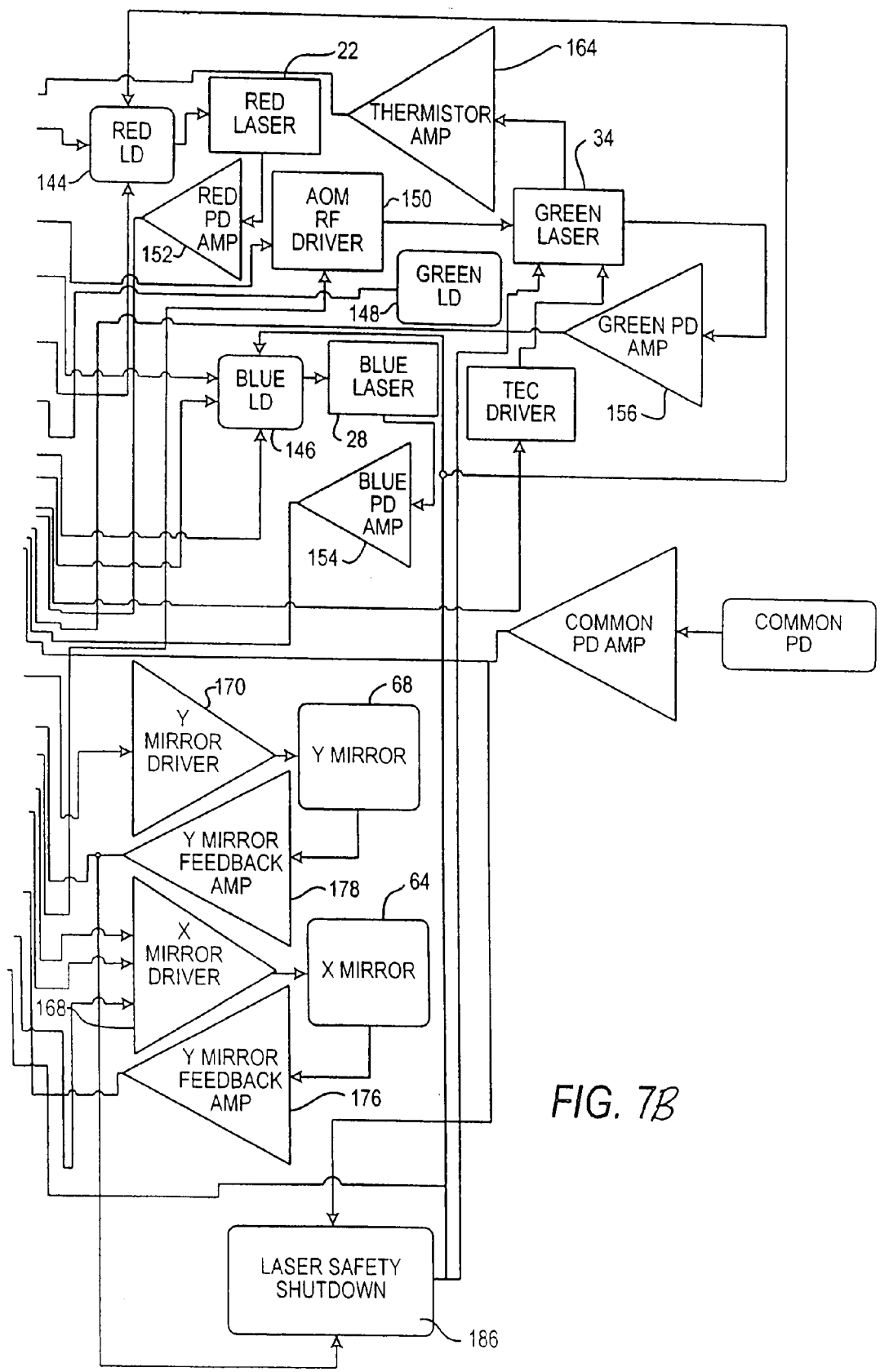

As shown in FIGS. 7A, 7B, an incoming videosignal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIGS. 7A, 7B, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

As previously noted, the red beam exiting the red laser 22 has an oval beam spot (see FIG. 8), and the rotationally symmetric lenses 24, 26 do not change the oval shape of the beam spot. The oval beam spot has mutually orthogonal long (vertical) and narrow (horizontal) spot dimensions and, in accordance with this invention, the red laser 22 is rotated on the support 100, 102 until the narrow spot dimension or width is oriented to extend along the horizontal scan direction, i.e., lengthwise along a respective scan line. As the horizontal scan mirror 64 (see FIG. 8) is swept along a respective scan line, the corresponding narrow horizontal dimension of the corresponding pixel, also known as a virtual pixel, is increased in size until it more closely matches the long vertical dimension of the corresponding pixel. When the horizontal and vertical dimensions of the pixel are the same, the pixel has a generally square, symmetrical shape. As previously noted, the use of symmetrical pixels in the projected image creates a more pleasing display.

The same is true for the blue beam exiting the blue laser 28. The blue beam also has an oval beam spot whose shape is unaffected by the rotationally symmetric lenses 30, 32. The blue laser 28 is turned relative to the support until the narrow spot dimension extends along the horizontal scan direction, and the corresponding horizontal pixel dimension is increased until it more closely matches the long vertical pixel dimension.

However, as for the diffracted green beam 40 reflected off the mirror 42, the beam spot is circular in cross-section. In this case, the lenses 44, 46 are employed to change the shape of the beam spot to an oval. For example, the lens 44 can be a cylindrical lens, and the lens 46 can be a rotationally symmetric plano-convex lens. The cylindrical and plano-convex lenses can be combined into a single toric lens. As another example, two mutually orthogonal cylindrical lenses could be used. Alternatively, a prism could be used to create an oval spot. In each case, the anamorphic optics has different optical powers in two orthogonal directions to change the shape of the beam spot.

As for the corresponding long vertical dimension of the pixel, this helps to blend adjacent scan lines arranged along the vertical scan direction. Thus, the long vertical dimension of a pixel on one scan line partially overlaps the long vertical dimension of an adjacent pixel on an adjacent scan line. The adjacent scan lines thus blend with each other to provide a more uniform display.

Still another application is to use the image projection arrangement in reverse to act as a camera for imaging a target image. In that case, the use of an elongated beam spot helps reduce speckle noise in the signal detected from the target image.

It will be understood that each of the elements described above, or two or more together, also may find a useful application in other types of constructions differing from the types described above.

While the invention has been illustrated and described as embodied in an arrangement for and method of increasing pixel symmetry, especially for image projection arrangements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of projecting an image, comprising the steps of:
    a) generating, from a laser, a laser beam having a beam spot in cross-section, the beam spot having an oval shape with mutually orthogonal long and narrow spot dimensions;
    b) sweeping the beam spot along mutually orthogonal scan directions to project a pattern of scan lines each having a number of pixels arranged along one of the scan directions, each pixel having mutually orthogonal pixel dimensions corresponding to the long and narrow spot dimensions;
    c) orienting the narrow spot dimension along the one scan direction by turning the laser, the pixel dimension along the one scan direction being larger than the narrow spot dimension along the one scan direction due to the sweeping to render the pixel dimensions more symmetrical, the long spot dimension of the beam spot extending along a transverse scan direction perpendicular to the one scan direction, the scan lines being arranged along the transverse scan direction, and the corresponding dimension of each pixel on each of the scan lines throughout the image along the transverse scan direction at least partially overlapping the corresponding dimension of each pixel on respectively adjacent scan lines throughout the image along the transverse scan direction; and
    d) causing selected pixels to be illuminated, and rendered visible, to produce the image with more symmetrical pixels.

2. The method of claim 1, wherein the generating step is performed by emitting the laser beam with a circular shape and optically modifying the laser beam with different optical powers in mutually orthogonal directions to produce the oval shape.

3. The method of claim 1, wherein the sweeping step is performed by oscillating at least one scan mirror at its mechanical resonant frequency to minimize power consumption.

4. The method of claim 1, and energizing the laser that emits the laser beam to illuminate the selected pixels, and deenergizing the laser to non-illuminate pixels other than the selected pixels.

5. The method of claim 1, wherein the generating step is performed by emitting the laser beam from one of a red, blue and green laser.

6. The method of claim 1, wherein the generating step is performed by emitting the laser beam from an edge-emitting semiconductor laser.

* * * * *